United States Patent [19]

Icking

[11] 4,304,262
[45] Dec. 8, 1981

[54] DEVICE FOR CONTROLLING ACTUATORS BY MEANS OF PNEUMATIC PULSES

[75] Inventor: Friedrich Icking, Oelde, Fed. Rep. of Germany

[73] Assignee: Westfalia Separator AG, Fed. Rep. of Germany

[21] Appl. No.: 133,043

[22] Filed: Mar. 24, 1980

[30] Foreign Application Priority Data

Apr. 11, 1979 [DE] Fed. Rep. of Germany ....... 2914741

[51] Int. Cl.³ ..................... F16K 31/122; F16K 11/06
[52] U.S. Cl. ............................ 137/624.2; 137/625.21; 251/230; 119/51 R
[58] Field of Search ........... 137/624.18, 624.2, 624.14, 137/625.11, 625.21; 251/230; 119/51 R, 52 AF, 53, 56 R

[56] References Cited

U.S. PATENT DOCUMENTS

| | | | |
|---|---|---|---|
| 2,641,280 | 6/1953 | Fleischauer | 251/230 X |
| 3,066,688 | 12/1962 | Young | 251/230 X |
| 3,136,335 | 6/1964 | Beech | 251/230 X |
| 3,489,175 | 1/1970 | Loveless | 251/230 X |

Primary Examiner—Alan Cohan
Attorney, Agent, or Firm—Sprung, Felfe, Horn, Lynch & Kramer

[57] ABSTRACT

A device for controlling actuators by pneumatic pulses includes a casing having an inlet for vacuum pulses and an outlet connectable to an actuator. A control wheel is rotatably mounted in the casing and has a plurality of indentations therein. A plunger is disposed in a chamber in the casing and is sealingly guided for movement from a normal rest position wherein the plunger is engaged with one of the indentations to a retracted position when the chamber is evacuated, wherein the plunger is engaged with a successive indentation. Rotation of the control wheel is effected when the plunger returns to the rest position. Fluid communication is provided between the inlet and the outlet and between the inlet and the chamber in the casing through the control wheel to control the supply of vacuum pulses to the outlet and to the chamber in dependence on the angular position of the control wheel.

12 Claims, 4 Drawing Figures

DEVICE FOR CONTROLLING ACTUATORS BY MEANS OF PNEUMATIC PULSES

BACKGROUND OF THE INVENTION

The invention relates to an apparatus for the control of actuators by means of pneumatic pulses, especially for the control of feeders in milking stands.

In the milking stands, feed is dispensed to the cows during the milking, this feed serving as a regular feeding or as a "treat". In the first case, each cow is individually given an amount of feed corresponding to her milk output. In the second case, all animals are dispensed the same small amount of feed which is intended to entice them into their milking stations.

The proportioning of the feed can be accomplished, for example, by means of a proportioning dispenser consisting of a compartmented wheel whose compartments are advanced by a certain angular amount each time so that the compartments are emptied one by one, thus dispensing a certain amount of feed (portion) to the animals. The animals each receive a total amount of feed corresponding to the number of movements of the compartmented wheel.

The feed distributor—the compartmented wheel in this case—can be operated by hand or mechanically, or also automatically on the basis of the presetting of the desired number of portions.

In the case of automatic dispensing, a drive must be provided which operates the compartmented wheel. In addition, the number of movements (portions) must be controlled. At this point a pulse control is used, which acts on a servo mechanism or directly on the actuator, e.g., on a pneumatically powered cylinder and piston.

The known controlling means in milking installations are electrical and electronic apparatus, which are sensitive, however, to environmental conditions such as moisture and aggressive atmospheres. Furthermore, these apparatus are of complex construction, and for even simple service operations an extensive technical knowledge is necessary, which the operators of these installations do not have in most cases. Also, for each feeder a pulse drive must be installed, and each drive has to be adjusted separately for each cow. This is also the case with the known pneumatic pulsators which operate on compressed air. Since the operators of milking installations ordinarily do not have compressed air available, such pulsators are inappropriate.

SUMMARY OF THE INVENTION

The object of the invention consists in creating an apparatus for the control of actuators, which will not have the deficiencies of an electrical or electronic control, but will operate on the basis of an available vacuum, and will be simple in construction and in use.

This object is achieved in accordance with the invention by providing in the housing of the apparatus a chamber in which a plunger is guided sealingly with respect to the chamber, and can be operated by means of a compression spring and a vacuum which can be delivered to the chamber, and turns an adjustable control wheel provided with a plurality of indentations, which is disposed between a rear and a front cover plate, and the control wheel has bores as well as passages which serve for the control of a pulsating vacuum being supplied to the apparatus.

The apparatus of the invention using the vacuum present in milking systems makes it possible to transmit any desired number of operating pulses automatically to one or more machines, while at the same time it is simple in construction and in operation, and does not have the deficiencies of conventional apparatus, especially electrical or electronic apparatus.

One advantageous embodiment of the subject matter of the invention is represented in the drawing, and will be further described hereinbelow.

DETAILED DESCRIPTION OF THE INVENTION

Figure 1:
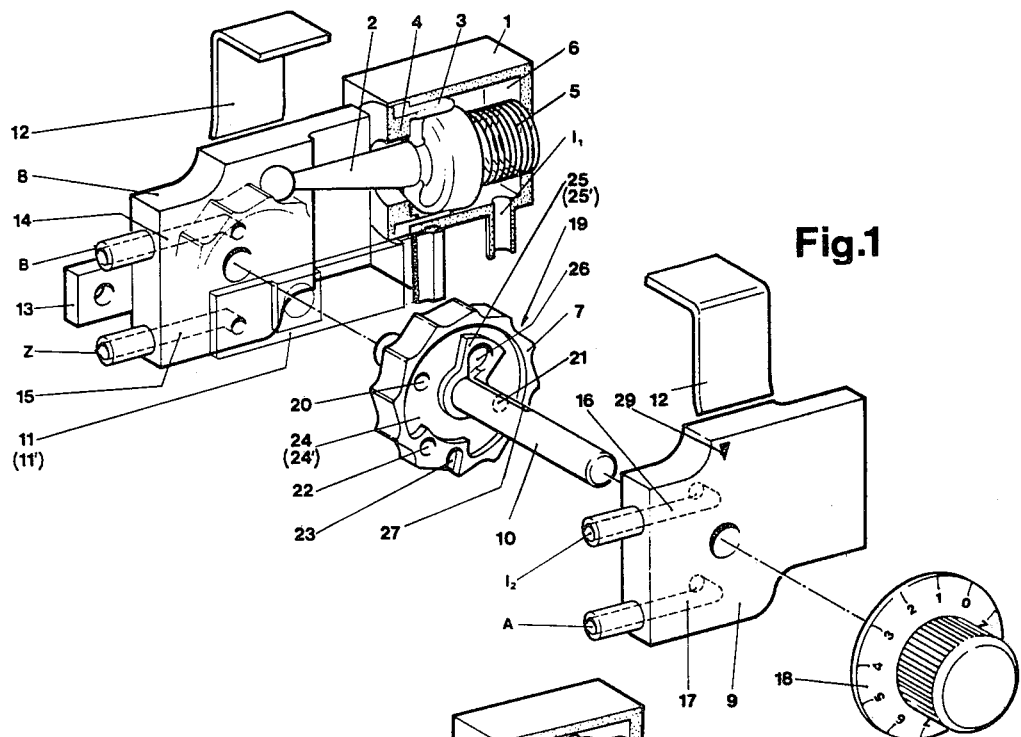
FIG. 1 is an exploded representation of the device according to the invention.

FIG. 1 is an exploded representation of a device for controlling actuators, comprising a casing 1 in which a plunger 2, joined to a membrane 3, is disposed, the membrane being fastened in the casing by means of a cover 4. The plunger is operated on the one hand by a compression spring 5 disposed in the casing, and on the other hand by a vacuum which can be delivered to the closed chamber 6 through the connection $I_1$.

The plunger 2 acts upon a control wheel 7 which is disposed between a rear cover plate 8 and a front cover plate 9 and whose shaft 10 is rotatably mounted in the cover plates. The cover plates in turn are held together by a spring clip 12 and by a front retainer 11 and a rear retainer 11' which are tightly fastened to the casing 1. The rear retainer 11' is provided with a lug 13 for mounting the device in a controller, for example.

The rear cover plate 8 is provided with connections B and Z as well as passages 14 and 15, and is in communication with the front cover plate 9 through passages and bores in the control wheel 7, cover plate 9 being provided with connections $I_2$ and A and with the passages 16 and 17. The control wheel is adjustable in the device by means of an adjusting dial 18 fastened to shaft 10, and has on its circumference any desired number of indentations 19 which can be engaged by the plunger. In the present example, twelve indentations are provided, making possible twelve settings of the control wheel.

A setting between 1 and 10 on the dial produces the desired number of actuations corresponding in the present example to the desired number of portions of feed; the zero position identifies the stop position, and Z identifies a ganged setting. The markings 1–10, 0 and Z, are imprinted on the dial 18 in alignment with the indentations on the control wheel.

Through-bores 20, 21 and 22 are provided in the control wheel 7; on its front side there is provided a cut-out 23, and on the front and rear sides equal recesses 24 and 24'. On the front and rear sides, equal sealing surfaces 25 and 25' are provided, the front surface 25 being provided with a cut-out 26 which communicates with the open air through a groove 27 in the shaft 10; the functions of these passages, bores and recesses will be further described in conjunction with the description of the operation of the device.

Figure 2:
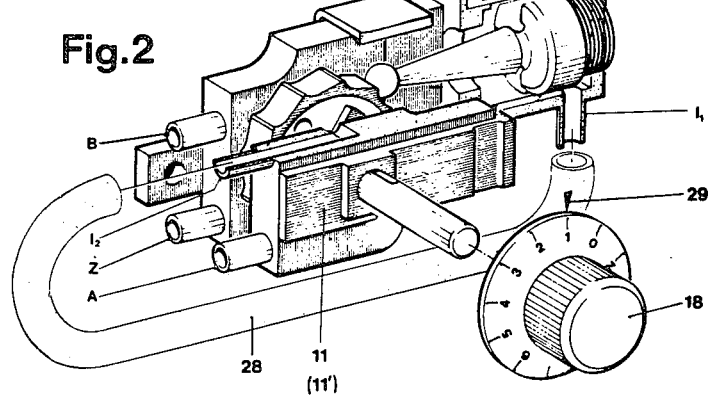
FIG. 2 is a perspective representation, partially cut away, of the assembled device.

FIG. 2 is a perspective representation of the assembled device in which the connections $I_2$ and $I_1$ are connected to one another by a tube 28. For the placement in operation of the device, connection B is connected to a pulsating vacuum line which is adjusted, for example, for 5 seconds of vacuum and 5 seconds of atmospheric pressure, under the control of a pulsator. Connection A is connected to an actuator which is to be controlled, and connection Z to a ganging line for the connection of additional devices, which will be discussed further below.

THE MANNER OF OPERATION OF THE DEVICE

By means of the dial 18, mounted on shaft 10 and provided with marking (1–10, 0, Z), the control wheel 7 is turned to any position from one to ten. In the example shown in FIGS. 1 and 2, the dial has been set at position 1, equal to one cycle of operation of the actuator or one portion of feed in conjunction with a feeder, the 1 on the dial being brought into alignment with a pointer 29 on the front cover plate 9.

In all of the settings from 1 to 10, the connections A, B, $I_2$ and Z are interconnected within the device by passages 14 and 15 in the cover plate 8 and recesses 24 and 24' as well as bores 20 and 21 in the control wheel and passages 16 and 17 in cover plate 9. Furthermore, $I_2$ is connected to $I_1$ by tube 28. The bore 22 is closed in these positions.

In a pulsating vacuum line connected to connection B, a vacuum is created for 5 seconds in the first phase of the working cycle; this vacuum evacuates the chamber of an actuator, such as the chamber of a vacuum cylinder, through connection A, thereby moving a piston which in turn produces a movement or a cycle of operation in a proportioning feeder, thereby causing one portion of feed to be released to an associated feed trough. At the same time the chamber 6 of the device is evacuated through the connection $I_2$, line 28 and connection $I_1$, thereby moving the plunger 2 against the force of the compression spring 5 from its rest position (FIG. 1) to its rearmost end position (FIG. 2). Since at the same time the recesses 24 and 24' in the control wheel 7 disposed between the two cover plates 8 and 9 are evacuated, the control wheel is gripped tightly, due to the external atmospheric pressure, between the two cover plates and is held in position when the plunger moves to its rearward end position.

The vacuum line receives atmospheric air through connection B in the second phase of operation for 5 seconds. Through the connection B, the connections A and $I_2$, and thus the actuator and the chamber 6, are vented, and at the same time the pressure by the front and rear cover plates on the control wheel is relieved. The plunger 2 is forced by the bias of spring 5 to the other end position, thus engaging an indentation 19 in the control wheel 7 and advancing the latter by one division. By this advancement the control wheel is brought from position 1 to position 0. In this position 0, no pneumatic pulses can get from the device to chamber 6 and through A to the actuator, since connection B and passage 14 are shut off by the rear surface 25' of the control wheel and the connection A is vented to the external atmosphere through the cut-out 23, and connection $I_2$ is vented through a groove 27 in the shaft 10 and cut-out 26 in the control wheel. In the case of a plurality of desired working cycles or feed portions, the operation just described is repeated.

Figure 3:
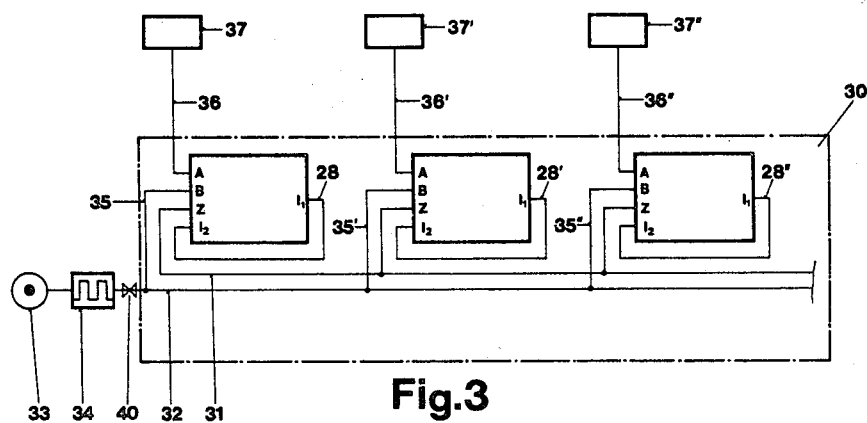
FIG. 3 is a block circuit diagram of several devices.
Figure 4:
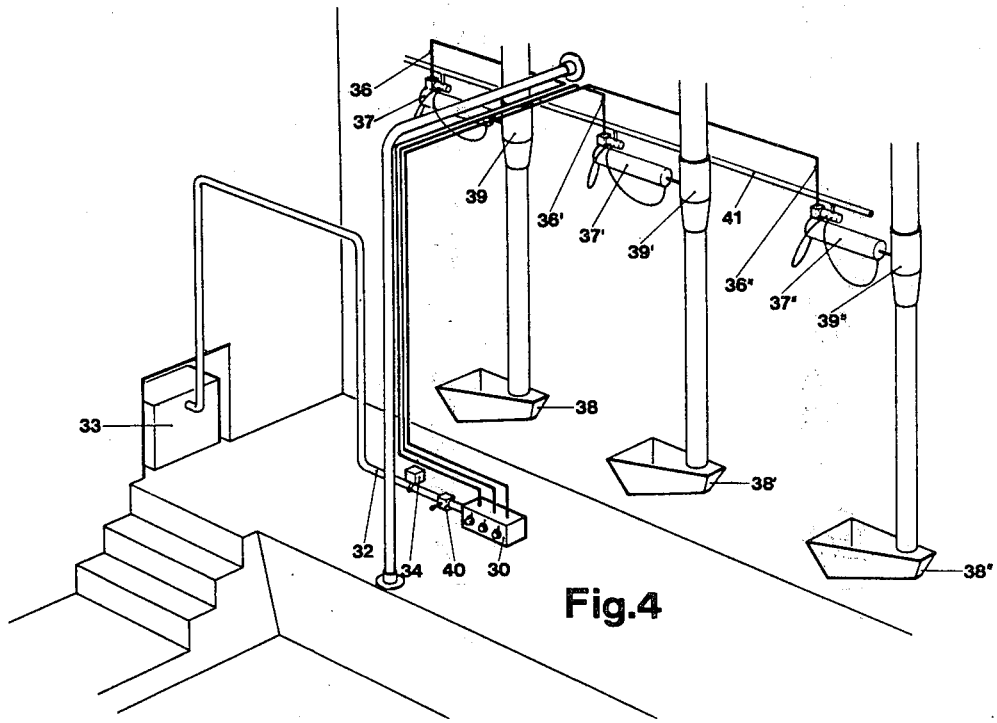
FIG. 4 illustrates the arrangement of the device in a diagrammatically represented milking stand provided with feed dispensers.

Since normally several feeders are provided at the milking stands and a separate device for controlling the feeder is associated with each feeder, these devices are combined in one unit (FIG. 3) and disposed, for example, in a common controller 30 (FIG. 4).

In an arrangement involving a plurality of devices, the devices are connected together by connections Z to a ganging line 31. The connections B are connected by lines 35, 35' and 35" to a pulsating vacuum line 32 leading to vacuum pump 33 and pulsator 34, and connections A are connected by lines 36, 36' and 36" to the actuators 37, 37' and 37", respectively. The first, second and third devices have their connections $I_1$, $I_2$ connected by tubes 28, 28' and 28", respectively.

When the second and third devices are set at Z, these and any additional devices not illustrated in the above-described circuit, each connected to one of the actuators 37, 37' and 37", are controlled by a single input device, e.g., the first device, which is set in a position from 1 to 10. If now a pneumatic pulse runs through the first device, this device is evacuated as described above, and the first actuator 37 is operated. At the same time evacuation takes place through connection Z of the first device as well as the ganging line 31 and connections Z of the additional devices, each through passage 15 in the rear cover plate 8 and bore 22 in the control wheel 7 to the connection A, from which the evacuation of the second and third actuators 37' and 37" then takes place.

In this arrangement, the plunger 2 is not operated in the second and third devices or any other devices following, because in position Z, the connection $I_2$ to the vacuum line is shut off by the surface 25, and they are vented to the atmosphere through groove 27 in shaft 10 and cut-out 26 in the control wheel.

If one or more devices are set at 0, no impulse can reach the corresponding actuator.

FIG. 4 shows a milking stand equipped, for example, with three feed troughs 38, 38' and 38" and a controller 30 with three devices in it, each operating, by means of the vacuum present in line 32, a corresponding actuator 37, 37' and 37", these being, for example, pneumatically operated actuating cylinders having a control valve connected to a vacuum line 41, these actuating cylinders operating a proportioner 39, 39' and 39" disposed above the feed troughs 38, 38', 38". The vacuum line 32 is connected to a vacuum pump 33 and a pulsator 34.

By the arrangement of a shut-off valve 40 in the vacuum line 32 ahead of the controller 30, it is possible to shut off the controller centrally for the purpose of setting the individual devices in the controller.

This device can, of course, be used also for other similar work operations.

It will be appreciated that the instant specification and claims are set forth by way of illustration and not limitation, and that various modifications and changes may be made without departing from the spirit and scope of the present invention.

What is claimed is:

1. A device for controlling actuators by pneumatic pulses, comprising: a casing having an inlet for vacuum pulses and an outlet connectable to an actuator; a chamber in the casing receptive of a vacuum supply, a control wheel rotatably mounted in the casing and having a plurality of indentations therein; a plunger disposed in the chamber of the casing; means sealingly guiding the plunger in the chamber for movement from a normal rest position wherein the plunger is engaged with one of the indentations to a retracted position when the chamber is evacuated wherein the plunger is engaged with a successive indentation and effecting rotation of the control wheel when the plunger returns to the rest position; means providing fluid communication between the inlet and outlet and between the inlet and the chamber through the entire width of the control wheel to control the supply of the vacuum pulses to the outlet and to the chamber in dependence of an angular position of the control wheel.

2. The device according to claim 1, wherein the casing comprises front and rear cover plates between which the control wheel comprising a single wheel is rotatably mounted, wherein the means providing fluid communication comprises passages in the end faces of the control wheel and throughbores connecting the end faces of the single wheel.

3. The device according to claim 2, wherein the chamber has a single connection for the supply of the vacuum pulses.

4. The device according to claim 3, further comprising a ganging connection and wherein the inlet and ganging connection are disposed on the rear cover plate and the means providing fluid communication comprises fluid passages connected to the inlet and ganging connection and terminating at one end face of the control wheel and wherein the control wheel has said one end face configured to connect the inlet and ganged connection when the control wheel is in a given angular position.

5. The device according to claim 4, further comprising a second connection connected to the single connection and wherein the outlet and second connection are disposed on the front cover plate and the means providing fluid communication comprises fluid passages connected to the outlet and the second connection and terminating at the other end face of the control wheel and wherein the control wheel has said other end face configured to connect the outlet and the second connection when the control wheel is in any one of a plurality of angular positions.

6. The device according to claim 1, wherein the guiding means comprises a spring biasing the plunger into the rest position.

7. The device according to claim 1, further comprising an indicator knob rotatable with the control wheel for turning same into a desired angular position.

8. A device for controlling actuators by pneumatic pulses, comprising: a casing having an inlet for vacuum pulses, an outlet connectable to an actuator and a ganging connection; a chamber in the casing having a single connection for the supply of the vacuum pulses; a control wheel rotatably mounted in the casing and having a plurality of indentations therein; a plunger disposed in the chamber of the casing; means sealingly guiding the plunger in the chamber for movement from a normal rest position wherein the plunger is engaged with one of the indentations to a retracted position when the chamber is evacuated wherein the plunger is engaged with a successive indentation and effecting rotation of the control wheel when the plunger returns to the rest position; means providing fluid communication between the inlet and outlet and between the inlet and the chamber through the control wheel to control the supply of the vacuum pulses to the outlet and to the chamber in dependence on the angular position of the control wheel comprising passages in the end faces of the control wheel, throughbores connecting the end faces of the control wheel and fluid passages connected to the inlet and ganging connection and terminating at one end face of the control wheel and wherein the control wheel has said one end face configured to connect the inlet and ganged connection when the control wheel is in a given angular position; wherein the casing comprises front and rear cover plates between which the control wheel is rotatably mounted and wherein the inlet and ganging connection are disposed on the rear cover plate.

9. The device according to claim 8, further comprising a second connection connected to the single connection and wherein the outlet and second connection are disposed on the front cover plate and the means providing fluid communication comprises fluid passages connected to the outlet and the second connection and terminating at the other end face of the control wheel and wherein the control wheel has said other end face configured to connect the outlet and the second connection when the control wheel is in any one of a plurality of angular positions.

10. The device according to claim 8, wherein the guiding means comprises a spring biasing the plunger into the rest position.

11. The device according to claim 8, further comprising an indicator knob rotatable with the control wheel for turning same into a desired angular position.

12. In an apparatus for the control of actuators for execution of a presettable number of successive identical work cycles by means of pneumatic pulses, wherein the pneumatic pulses are fed to a chamber which is contained in the housing of the apparatus and in which a plunger guided sealingly with respect to the chamber is disposed, said plunger operating an adjustable control wheel which is provided with a plurality of indentations at its periphery, is disposed between a front cover plate and a rear cover plate, and is provided with bores which when aligned with apertures in the two cover plates establish an air channel between a source providing a pressure differential relative to atmospheric pressure and means for initiating the work cycles, the improvement wherein:

a. the plunger is guided by means mounting same for movement between a rest position and a retracted position against a spring bias and the source for providing a pressure differential comprises a vacuum source producing a pulsating vacuum which is simultaneously fed to the chamber to move the plunger into the retracted position;

b. the two cover plates comprise members covering the entire control wheel;

c. means forming a zero pulse actuation position for the control wheel wherein the bores and indentations are located in the control wheel to establish said air channel except when the control wheel is in the zero position and the control wheel comprises a sealing surface and venting aperture wherein, in the zero position of the control wheel, the feed to the aperture in one of the cover plates is shut off by the sealing surface of the control wheel and the vacuum pulses are vented through the venting aperture in the control wheel to the outer atmosphere.

* * * * *